INVENTOR.
Philip D. Wasserman

Sept. 15, 1964  P. D. WASSERMAN  3,149,282
DIGITAL VOLTMETER
Filed Dec. 13, 1961  6 Sheets-Sheet 2

INVENTOR.
Philip D. Wasserman
BY Hugh L. Willis Jr.

Sept. 15, 1964 P. D. WASSERMAN 3,149,282
DIGITAL VOLTMETER
Filed Dec. 13, 1961 6 Sheets-Sheet 3

INVENTOR.
Philip D. Wasserman
BY

United States Patent Office 3,149,282
Patented Sept. 15, 1964

3,149,282
DIGITAL VOLTMETER
Philip D. Wasserman, San Diego, Calif., assignor to Cubic Corporation, San Diego, Calif., a corporation of California
Filed Dec. 13, 1961, Ser. No. 159,109
16 Claims. (Cl. 324—99)

The present invention relates to an improved digital voltmeter and more particularly to a digital voltmeter system comprising an optimized combination with synchronous digital computer logical techniques and electromechanical components.

The basic operating procedure employed in digital voltage measuring instruments is that of periodically comparing an unknown input voltage against an incrementally controlled precise feedback voltage, taken from a potentiometer arrangement. Following each comparison, the feedback voltage is incrementally modified in a direction to make it closer in value to the input voltage. Then, whenever null occurs, that is, the two voltages match, an output reading based on the balance position of the potentiometer may be taken to represent the input potential.

Fundamentally, two broad approaches have been followed in manipulating the potentiometer portion of the system in securing the feedback voltage. In one of these, purely electronic means are employed in which, for example, the conduction state of a flip-flop acts through a precision voltage and resistor arrangement to add or not add a corresponding voltage increment to the overall reading. This all-electronic approach yields a very high sampling or reading rate since only electronic elements are involved. At the same time, however, ultimate accuracy cannot be achieved since the electronic characteristics of devices such as transistors, diodes, vacuum tubes, etc., which enter into the overall potentiometer readings vary somewhat with age and operating conditions.

The other fundamental approach to mechanizing the potentiometer is the employment of electro-mechanical devices such as relays, stepping switches, etc. in which voltage increments are added by metal-to-metal contacts made between mechanical contact points. This approach yields extremely high accuracy since the contact resistance is very low and is relatively stable with time. At the same time, however, the stepping switch approach yields instruments which are slow, cumbersome, and relatively unreliable because of the electro-mechanical nature of their key components.

Hence, in general the two approaches followed in mechanizing digital voltmeters have complementary advantages and disadvantages. The all-electronic approach is very fast, reliable, but relatively inaccurate while the electro-mechanical approach is slow, relatively unreliable, but highly accurate.

The digital voltmeter system according to the present invention combines the best features of the two approaches without their attendant disadvantages. In principle, the only electro-mechanical devices in the system are high speed, reed relays employed in the potentiometer circuitry while the programming, switching, and other functions required in the voltmeter operation are mechanized electronically by digital computer techniques including flip-flops and gating circuitry. Thus, the present system offers high speed, high reliability and high accuracy.

In particular, the input voltage and feedback voltage are applied to the two input terminals of a chopper and the resulting output square wave is differentiated and amplified to form a first output pulse stream, and then complemented to form a second pulse stream, complementary to the first stream. These two pairs of complementary pulse stream signals, termed UP and DOWN, serve as two basic clock signals for the voltmeter logic circuitry and correspond to the clock signal employed in so-termed synchronous digital techniques.

The potentiometer and readout arrangement of the system includes four decades, designated units or $10^0$ decade extending through the thousandths or $10^3$ decade, each connected to an appropriate decimal readout unit. Each of the decade units includes four flip-flops whose conduction state combination at any time represents one of the decimal digits, 0 through 9, which is displayed by an associated visual readout unit.

Each decade unit is connected to a section of a Wolff type potentiometer arrangement and, in particular, each flip-flop is associated with a pair of equally valued resistors respectively shunted by reed relays in two respective halves of the potentiometer. When a flip-flop is "on," its associated reed relay in the output or computing potentiometer section is open or de-energized and the corresponding resistor placed in the circuit to thereby add a voltage increment corresponding to its flip-flop's relative value in the system readout. When a flip-flop is "off," the same resistor is shunted out by the reed relay, now energized, with the result that no voltage increment is applied to the output voltage by that flip-flop. The use of both flip-flop output signals with associated resistors and relays in the manner stated always places one resistor in series between the precision voltage source and ground and thereby maintains a constant loading on the voltage source as is required for high accuracy operation.

Each decade unit responds to an applied input DOWN pulse to count down by one digit the decimal value represented by its conduction state combination. Now, the voltmeter programming is performed by a programming and reset unit which includes three flip-flops in addition to gating circuitry and employs the complementary UP and DOWN pulse streams as inputs.

The basic programming procedure followed in the voltmeter system is that of continuously sampling the input voltage, cycling through to produce a null reading, and then initiating the next cycling operation to produce another output reading at the end of the next sample time, etc. Prior to each cycle, all decade units are zeroed with an overall zero reading being presented by the decade visual readout units and a zero or ground output potential level being applied by the potentiometer to the chopper unit. This zeroing operation also places the three flip-flops in the programming unit at an initial conduction state combination. Then, since the potentiometer voltage is zero, an UP pulse is first produced which signifies that the potentiometer reading is too low and hence must be increased. This UP clock both changes the conduction state combination of the program flip-flops and sets the most significant or $10^3$ decade stage to its maximum or "9" reading.

If the resulting potentiometer voltage is too high at this point, then DOWN pulses are produced which are routed by the programmer flip-flops to this most significant decade where the initial "9" value is counted down, one digit at a time, by each DOWN pulse. This continues until the feedback voltage is lower than the input voltage at which time another UP pulse is produced which changes the programmer flip-flops' attention to the next-to-most significant or $10^2$ decade and simultaneously sets the value in this $10^2$ decade from its initial decimal "0" to decimal "9" value. Subsequent DOWN pulses reduce the $10^2$ decimal digit reading in one decimal digit steps until the next UP pulse occurs at which time the previously described cycle is repeated but for the $10^1$ or tens decade. The sample is completed whenever an UP pulse is produced during action on the least significant or $10^0$ decade. The reading at that time represents the input voltage and the next following UP pulse acts to reset all decade units to their "0" value with the next sample cycle being then ready to proceed. This reset operation represents a fairly general logical feature and is also produced automatically if the program flip-flops get into an undefined conduction state combination, if the input voltage suddenly changes to a value during a cycle such that null cannot be established, or if erroneous flip-flop triggerings in one of the decade units makes it impossible to obtain null during that cycle time.

It is, accordingly, the principal object of the present invention to provide a digital voltmeter measuring instrument which comprises an optimized combination of synchronous digital computer logical techniques and high speed electro-mechanical relays.

Another object of the present invention is to provide a digital voltmeter system which compares an applied unknown voltage against a controlled feedback voltage and incrementally modifies the feedback voltage to the point that it equals the input voltage and displays the magnitude of the feedback voltage as a digital output number to hence represent the value of the input voltage at null.

Still another object of the present invention is to provide a digital voltmeter system which generates a feedback voltage, compares it with an applied input voltage and produces UP and DOWN clock pulses based on the input voltage being larger and smaller, respectively, than the feedback voltage, and then employs the UP and DOWN clock pulses in synchronous digital computer circuitry for incrementally modifying the feedback voltage to the point it equals the input voltage.

A further object of the present invention is to provide a digital voltmeter which compares an unknown input voltage against an internally generated voltage whose magnitude is governed by the conduction state combination of a series of flip-flops and modifies the conduction state combination of the series of flip-flops according to a predetermined logical order until the input and internally generated voltages are of equal magnitude.

A still further object of the present invention is to provide a digital voltmeter system which includes a series of decade sections visually displaying a series of respective output decimal digits forming a corresponding decimal number and producing a series of respective feedback voltages corresponding to the series of respectively displayed decimal digits, in which the feedback voltages from the decade units are summed together and the resulting magnitude periodically compared to an unknown input voltage with each comparison resulting in a change of a displayed decimal digit and feedback voltage produced by one of the decade units, the change being in a direction to bring the summed voltage toward equalization with the input voltage.

Another object of the present invention is to provide a digital voltmeter system which includes a series of decade sections which both visually display a series of respective output decimal digits forming a corresponding output decimal number and operate on corresponding portions of a potentiometer by respective shunting actions to produce a potentiometer resistance which is proportional to the output number, the potentiometer resistance value being converted into a corresponding feedback voltage which, in turn, is periodically compared to an unknown input voltage and the comparison employed to successively modify the decade unit readings until null is obtained.

Still another object of the present invention is to provide a digital voltmeter system which includes a series of decade sections which visually display a series of respective output decimal digits forming a corresponding output decimal number, each of the decade sections operating on corresponding portions of a potentiometer by a shunting action to produce a portion of the total potentiometer resistance which is both proportional to its particular decimal digit representation and to the significance of its decimal digit in the output number, the total potentiometer resistance value being converted into a corresponding feedback voltage which is periodically compared to an unknown input voltage and first and second output signals produced when the input voltage is higher and lower, respectively, than the potentiometer feedback voltage, the second signals being routed by a programmer unit to the decade section selected by its programming state, the selected decade section counting down each second signal in single decimal digit steps, the first signals being used to change the programming unit to select the next following decade section, the operation continuing until null is obtained at which time the feedback voltage equals the input voltage and the displayed output number corresponds to the value of the applied input signal.

Other objects, features and attendant advantages of the present invention will become more apparent to those skilled in the art as the following disclosure is set forth including a detailed description of a preferred embodiment of the invention as illustrated in the accompanying sheets of drawings, in which.

Figure 1:
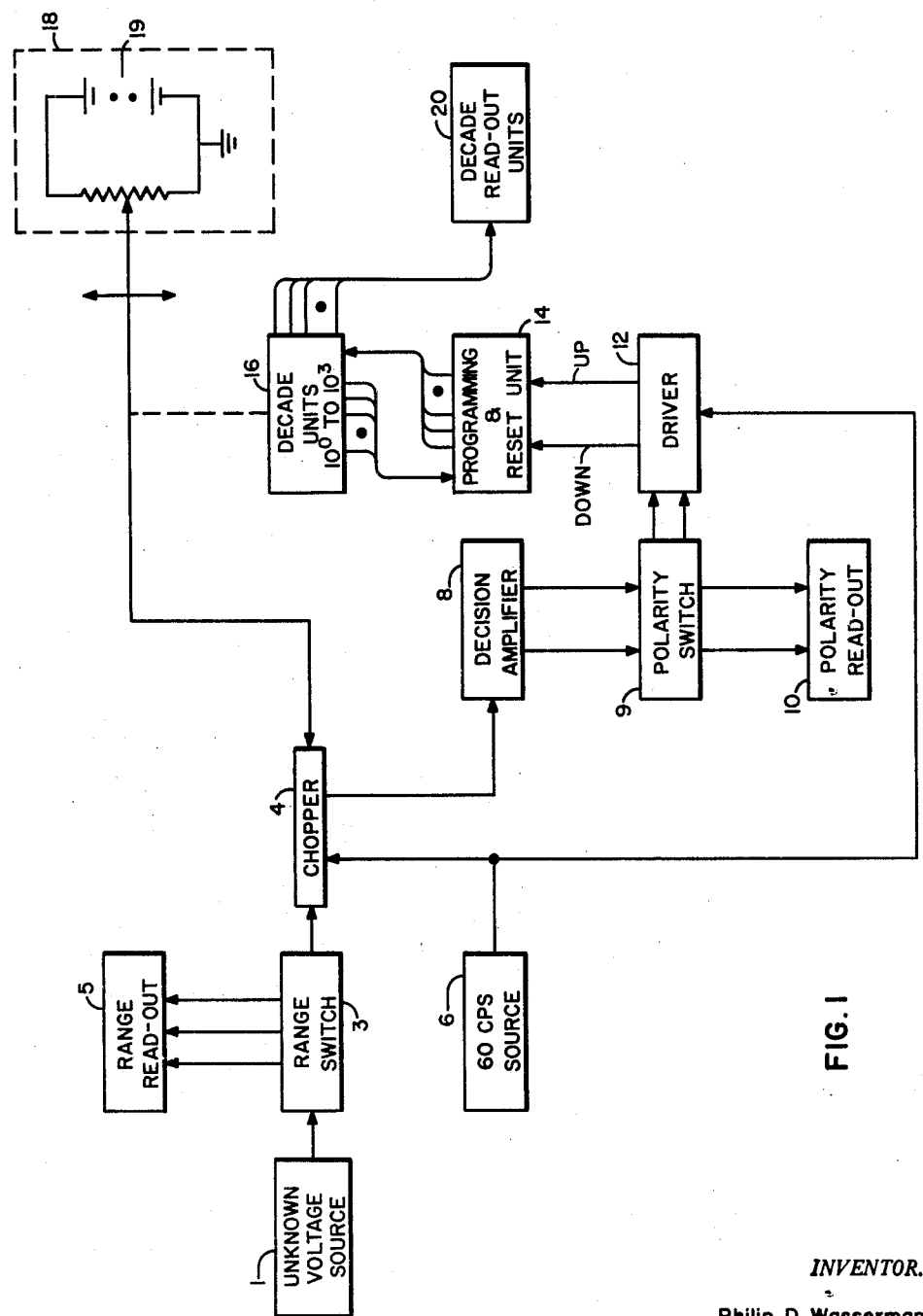
FIGURE 1 illustrates in block diagrammatic form the digital voltmeter system according to the present invention.

Referring now to the drawings, wherein the same elements are given identical numerical designations throughout the several figures, there is illustrated in FIGURE 1 the digital voltmeter system according to the present invention. The signal whose voltage is to be measured by the system is indicated generally as coming from an unknown voltage source 1 and is coupled through a manually operated range switch 3 to one signal input terminal of a chopper 4. A range readout unit 5 is coupled to range switch 3 for providing a visual presentation of the range switch position in the form of a decimal point positioned between the appropriate decimal digits of a displayed output number, not specifically illustrated in the figure.

The output signal from a source of alternating potential, for example, a 60 c.p.s. source 6, is applied to the armature driving terminal of chopper 4 and the output signal from the chopper is applied to the input terminal of a decision amplifier 8. Amplifier 8 produces a pair of complementary pulse trains which are passed through a manually operated polarity switch 9 to a driver unit 12. A polarity readout device 10 is coupled to polarity switch 9 to present an output visual indication of the polarity of the input voltage being measured, as based on the particular position of switch 9.

Driver 12 additionally receives the 60 c.p.s. signal from source 6 as an input signal and includes a pair of output conductors, designated UP and DOWN. These output conductors are coupled to a programming and reset unit 14 which, in turn, is coupled to four decade units, $10^0$ to $10^3$ shown generally in a decade unit system 16. The decade units are indicated schematically as driving the moveable arm of a potentiometer coupled across a reference potential source 19, both within a potentiometer unit 18. Finally, the series of decade units in system 16 are coupled to a corresponding series of decade readout units indicated generally at 20.

Although the detailed operation of the FIGURE 1 system will be made more clear during subsequent discussions of FIGURES 2 through 6, a brief résumé of its operation is set forth at this point. Range switch 3 is adjusted to attenuate the voltage produced by source 1 to be no higher than the maximum voltage capable of being produced by potentiometer unit 18, corresponding to the potential of source 19. Chopper 4, driven at 60 c.p.s. by source 6, alternately places the attenuated, unknown input voltage and the feedback voltage from the potentiometer on its output terminal. The resulting square wave is effectively differentiated into alternate positive and negative pulses, uniformly amplified and a complementary pulse stream produced, all by decision amplifier 8. The resulting two complementary pulse streams contain information as to whether the input or feedback voltage is higher in magnitude by the sequence of their responsive polarities. Also, their pulse amplitudes indicate the potential differences between the input and potentiometer feedback signals. Polarity switch 9 serves to couple the pulse trains from amplifier 8 either directly to driver 12 in the case of a positive input voltage, or reverses the amplifier 8 output signal pair to driver 12 in the event of a negative input voltage. Polarity readout unit 10 is coupled directly to the polarity switch and produces either a plus (+) or a minus (−) sign visual readout as a portion of the display based on the polarity switch position.

Driver 12 employs the input 60 c.p.s. signal from source 6 to create a clock signal which occurs at a predetermined phase point in each cycle of the 60 cycle source. The clock intervals thus generated overlap the chopper 4 contact points and hence includes the periodic pulses appearing in the amplifier 8 complementary output signals. Driver 12 employs the clock signal and the amplifier 8 complementary pulse streams to produce either an UP pulse, a DOWN pulse, or no pulse. In particular, assuming the input signal is of positive polarity, an UP pulse is produced if the input voltage is greater than the potentiometer voltage, and a DOWN pulse is produced if the input voltage is lower than the feedback signal. On the other hand, no pulses are produced unless a predetermined minimum potential difference exists.

The system employs four decade units, each having an associated readout, and each being associated with a particular portion of potentiometer unit 18. Each decade unit includes four flip-flops arranged as a binary coded decimal counter having ten different conduction state combinations representing the decimal digits 0 through 9. The particular decimal digit represented by the flip-flop conduction state combination of each decade is displayed at all times as a decimal digit in its associated readout unit.

The individual flip-flops in each decade unit are coupled separately to the potentiometer circuitry and, if "on" cause a voltage increment added by its portion of the potentiometer to the overall feedback reading, the amount of voltage thus added corresponding to its own particular digit value in its decade unit and its decade's relative value to the remaining decade units.

Now, programming and reset unit 14 includes three flip-flops whose conduction state combination serves to determine where the individual UP and DOWN signals from driver 12 are applied. In particular, this combination establishes which particular decade the DOWN pulses from driver 12 are routed to while the UP pulses act directly on these programmer flip-flops to change their conduction state combination with a subsequent rerouting of the following DOWN pulses.

In addition, programming and reset unit 14 senses the existence of certain conditions, for example, unspecified programmer flip-flop conduction state combinations, certain appearances of DOWN pulses, etc., to order a general reset operation in which all decade units are effectively cleared to "0" and the programmer flip-flops reset to an initial condition which selects the most significant decade unit $10^3$ for subsequent actuation.

As noted earlier, the detailed operation of the system will be more clear after discussion of subsequent figures. In particular, the details and operation of range switch 3, chopper 4, decision amplifier 8, the polarity switch 9, polarity readout 10 and driver 12 are shown in more detail in FIGURE 2. Programmer and reset unit 14 is illustrated in more detail in FIGURE 3 and its subsequent programming orders illustrated in flow diagram form in FIGURE 4. A typical decade unit, $10^0$, with an associated readout unit is illustrated in FIGURE 5. Finally, potentiometer unit 18 is shown in more detail in FIGURE 6.

Figure 2:
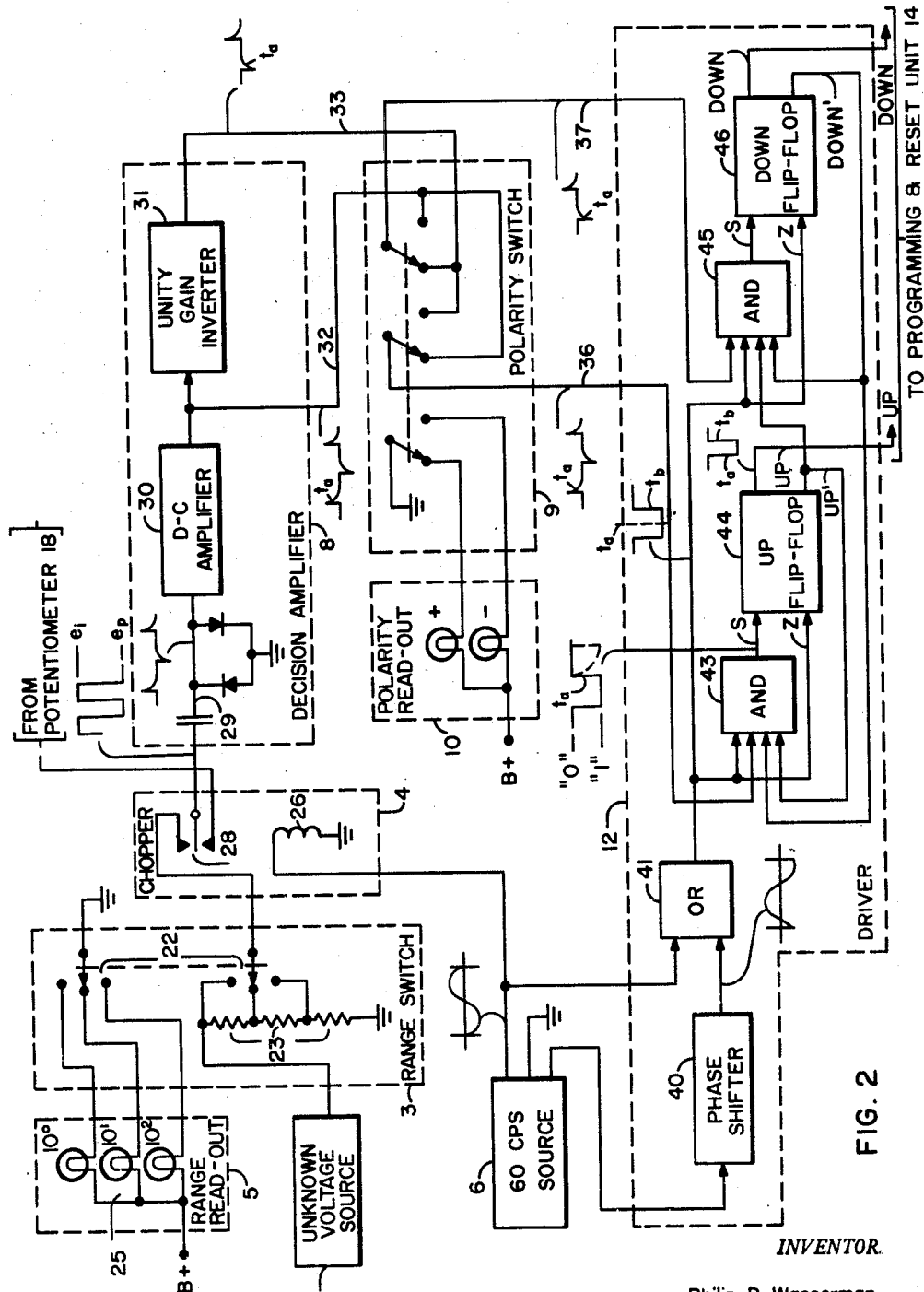
FIGURE 2 illustrates the range switch, chopper, decision amplifier, polarity switch and driver circuits in partly schematic and partly block diagrammatic form.

FIGURE 2 shows a more detailed breakdown of some of the system units of FIGURE 1, including the range and polarity switches, the chopper, decision amplifier, and driver along with representative signal waveforms for illustrating the operation of the circuitry. In particular, range switch 3 includes a two wafer, three position switch 22. The output signal of the unknown voltage source 1 is applied to one end of three serially-connected precision resistors 23, the other end of resistors 23 being connected to ground. The output terminal of the voltage source and the pair of junction points made by the serial connection of resistors 23 are respectively connected to the three fixed contacts of the lower wafer of switch 22, the moveable contact arm of this wafer representing the output terminal of the range switch. The moveable switch arm of the upper wafer is connected to ground and its three fixed contact points are connected to one side of each of three respective indicator lamps, generally designated 25, the other sides of the lamps being connected together to the B+ terminal of a source of positive potential, not specifically illustrated.

In operation, resistors 23 act as a voltage divider for the input potential and, with switch 22 thrown to its upper contact position, the full input voltage is applied to chopper 4 and the remaining digital voltmeter circuitry. In the consecutive two lower contact positions, an increase in voltage division is effected by the range switch with a correspondingly reduced percentage of the input voltage being applied to the chopper. Hence, the upper contact point of switch 22 represents the most sensitive range scale while the lower contact points represent successively less sensitive scale positions for accepting successively higher input voltages for measurement and display purposes. The upper wafer of the range switch serves to route the B+ energy through the range readout lamp corresponding to its switch arm position. The particular lamp thus energized will, in a preferred embodiment, cause a decimal point to be lit between the appropriate two digits corresponding to the range switch position in the output decade readout units 20. The manner of displaying such a decimal point will become more apparent later after discussion of a decade readout unit.

Chopper 4 includes a driving coil 26 energized by the 60 c.p.s. signal from source 6 which drives the armature of a chopper mechanism 28 between fixed upper and lower contact points connected, in turn, to the output conductor of range switch 3 and the output conductor from the potentiometer, respectively. Since chopper 4 is driven at 60 c.p.s., the output signal appearing on its moveable arm will be a square wave, as shown, having a 60 c.p.s. frequency which will vary between one voltage level $e_i$, corresponding to the input potential as attenuated by the range switch, and another voltage level $e_p$ from the potentiometer. The sample waveform shown shows the input voltage $e_i$ as being the higher of the two.

The chopper square wave output signal is differentiated by a capacitator and shunt diode arrangement, indicated at 29, just within decision amplifier 8. The differentiated waveform is likewise indicated and is passed through a highly stabilized linear D.-C. amplifier 30 to form one output signal appearing on an output conductor 32. This output signal is likewise applied through a unity gain inverter 31, also within amplifier 8, to form the second or complementary output signal on another output conductor 33. The leading, positive pulse on the D.-C. amplifier 30 output signal is referenced at a time $t_a$, as is the leading and corresponding negative pulse coming from inverter 31.

Polarity switch 9 is a three-wafer, two-position variety and in the clockwise position representing a positive polarity, as shown, couples input leads 32 and 33 from amplifier 8 directly to its own output leads 36 and 37. The left-hand wafer of the switch serves to selectively pass current through one of a pair of indicator lamps designated "+" and "−" in the polarity readout unit 10. In the position illustrated, the "+" lamp is the one energized. In the other switch position, input leads 32 and 33 are connected to output conductors 37 and 36, respectively, while the other or "−" lamp is energized to indicate a negative polarity of input voltage. The pair of indicator lamps in the polarity readout unit 10 are preferably positioned ahead of the most significant digit decade and serve when lit, to illuminate respective "+" and "−" symbols.

Considering now driver 12, one output phase of the 60 c.p.s. signal from source 6 is passed through phase shifter 40 to one input terminal of an "or" circuit 41, while the other phase is coupled directly to the other input terminal of "or" circuit 41. The output signal of the circuit 41 is coupled to one input terminal of each of a pair of "and" gating circuits 43 and 45. Conductors 36 and 37 from the polarity switch are coupled to another input terminal of each of "and" circuits 43 and 45, respectively. The output terminals of "and" circuits 43 and 45 are coupled to the set input terminals of a pair of flip-flops 44 and 46, respectively, designated UP and DOWN, respectively. The signal appearing on the set or "one" output terminal of the UP flip-flop 44 represents the UP output signal of the driver unit as it is applied to the programming and reset unit 14.

The set or "one" output signal of DOWN flip-flop 46 represents the DOWN signal from the driver circuit as applied to the programming and reset unit 14. The reset or zero output signal, designated UP', from the UP flip-flop is applied to another input terminal of each of "and" circuits 43 and 45 while the reset or zero output signal, designated DOWN' of DOWN flip-flop 46 is applied to another input terminal of each of "and" circuits 43 and 45. Finally, the output signal from "or" circuit 41 is applied to the Z or zero input terminals of both the UP and DOWN flip-flop.

Driver 12 is composed primarily of the type of circuitry which has evolved in digital computer techniques, and as such, may take any one of a large number of detailed forms as will be appreciated by those skilled in the art. In explaining its operation, it is assumed that the pnp type of germanium or silicon semi-conductor units are employed in the flip-flop circuitry and the voltage levels employed in the gating and flip-flop circuits for representing the binary digits of "zero" and "one" taking ground and negative potential levels, respectively. Hence, in the waveforms illustrated, each upper relatively high voltage level shown represents a "zero" while each relatively low voltage signal signifies a "one."

Considering now the detailed operation of driver 12, the 60 c.p.s. signal received by phase shifter 40 from source 6 is of opposite polarity from the 60 c.p.s. signal applied to chopper 4 and may be taken, for example, from the opposite end of a transformer having a grounded center-tap. By delaying this signal approximately 45° through phase shifter 40, as is indicated by the associated waveform, the resulting "or" circuit 41 output signal will contain a low voltage level appearing for the same number of degrees, 45°, in each complete cycle measured by the 60 c.p.s. signal. Now, since the same 60 cycle signal is employed to drive chopper 4, a predetermined phase relationship exists between the low voltage level, or "1" portion of the "or" circuit's output signal and the complementary output signals from amplifier 8. The parameters between the two are such that a $t_a$ point, representing the instant of engagement between the armature of the chopper and its upper contact point falls about midway in the low level or "1" interval of the "or" signal, as is indicated in the accompanying waveform.

"And" circuit 43 produces a low or "1" output level only when all of its associated applied input signals are likewise low or "1." If both UP and DOWN flip-flops are "off" or "0," then the output of this "and" circuit will be "1" during the first half of the "1" interval from "or" circuit 41 or until the conductor 36 signal coming from the decision amplifier goes positive or "0" at the $t_a$ instant, as shown in the accompanying waveform. When this occurs, the positive going portion of the signal as applied to the set terminal, triggers the UP flip-flop "on" as indicated by the "1" or low level in the waveform associated with its UP output conductor. This output "1" signal represents an UP clock pulse and is employed in the remaining digital voltmeter circuitry in a manner to be shortly described. The end of the "1" interval in the "or" circuit 41 signal is indicated by time $t_b$ and in being applied to the Z or zero input terminals of both UP and DOWN flip-flops causes, either flip-flop, if "on," to be triggered "off" as is specifically indicated in the UP output signal waveform. Hence, the $t_b$, positive going portion of the "or" circuit 41 waveform acts to order a reset operation on both the UP and DOWN flip-flops once each 60 c.p.s. input signal cycle.

The application of the logic DOWN' signal to "and" circuit 43 and signal UP' to "and" circuit 45 acts to prevent simultaneous triggering of the UP and DOWN flip-flops to their "1" state by circuit noise.

It will be appreciated that, continuing the example shown, if the input voltage were lower than the potentiometer feedback voltage, a negative pulse would be produced during the $t_a$ interval by amplifier 30 which would have no effect on the operation of the UP flip-flop. On the other hand, the $t_a$ interval pulse from inverter 31 would be positive and would be coupled through polarity switch 9 to "and" gate 45 with a subsequent triggering of the DOWN flip-flop and a resulting DOWN output clock signal being passed to the programming and reset unit 14.

Figure 3:
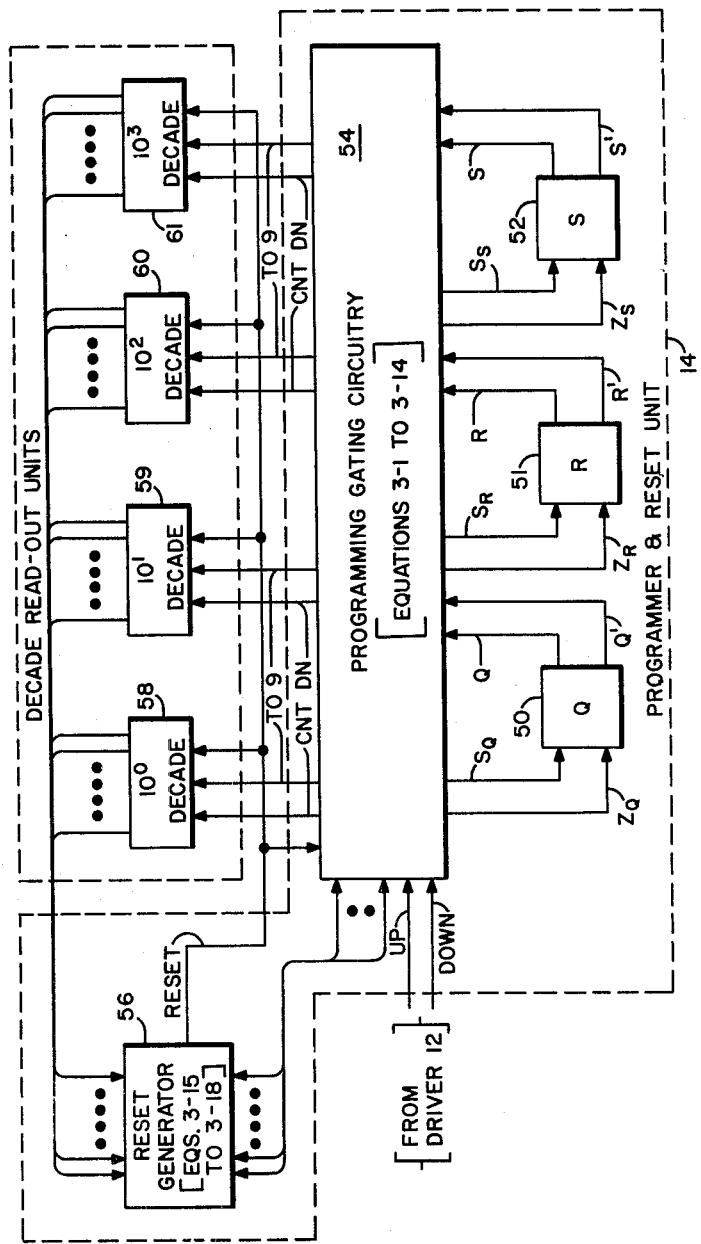
FIGURE 3 is a block diagrammatic showing of the programmer and reset unit in association with the series of decade readout units.

FIGURE 3 shows the programming and reset unit in block diagrammatic form and its inter-connections with the decade readout units. The unit includes three flip-flops 50, 51 and 52 which are designated Q, R, and S, respectively. A programming gating circuitry unit is indicated at 54 and includes a number of "and" and "or" gating circuits, not specifically shown, whose mechanization is defined shortly in a series of Boolean equations. The Q flip-flop 50 includes a pair of input terminals $S_Q$ and $Z_Q$, representing set and zero input functions, respectively, which receive triggering signals from gating circuitry 54. The Q flip-flop produces a pair of complementary output signals, designated Q and Q', which are applied as input signals to gating circuitry 54. In the same way, the set, $S_R$, and the zero, $Z_R$, input terminals of the R flip-flop are connected to the gating circuitry while its complementary output signals, R and R', are applied to the gating circuitry. The input and output terminals of the final flip-flop S are connected to the gating circuitry and are designated similarly to the corresponding terminals of the Q and R flip-flops. The UP and DOWN signals from driver 12, FIGURE 2, are applied to the programming gating circuitry 54 and a series of output signals, created within the circuitry, are applied to reset generator 56 which serves to produce reset signals upon the occurrence of certain specified logic conditions, as noted later.

The decade readout units include four separate readout decades 58, 59, 60 and 61 and designated as the $10^0$ decade, $10^1$ decade, $10^2$ decade, and $10^3$ decade, respectively. A typical decade is shown in more detail in the following FIGURE 5 and includes flip-flops, gating circuitry, and additionally drives a decimal display section and a corresponding portion of the potentiometer circuitry, neither of the latter two functions being indicated in this FIGURE 3. The programming gating circuitry 54 is coupled to each of the four decade units by separate pairs of conductors. In particular, one conductor designated "CNT DWN," representing "count down" and another conductor designated "to 9" are coupled from circuitry 54 to each of the decade units. In addition, a series of conductors are connected from each decade unit to reset generator 56 while the output signal, designated "reset" from the reset generator is applied to gating circuitry 54 and to each of the decade units 58, 59, 60 and 61.

In operation, each conduction state combination of the Q, R, and S flip-flops serves to route incoming DOWN signals from the driver to a particular decade unit where they are counted in a down direction. On the other hand, the UP signals from driver 12 serve to change the conduction state combination of the Q, R, and S flip-flops and thereby cause a different decade unit to be selected for the next DOWN signals. The UP pulse is also routed to one of the "to 9" output lines and acts to set the newly selected decade unit to an initial decimal output value of "9."

Figure 4:
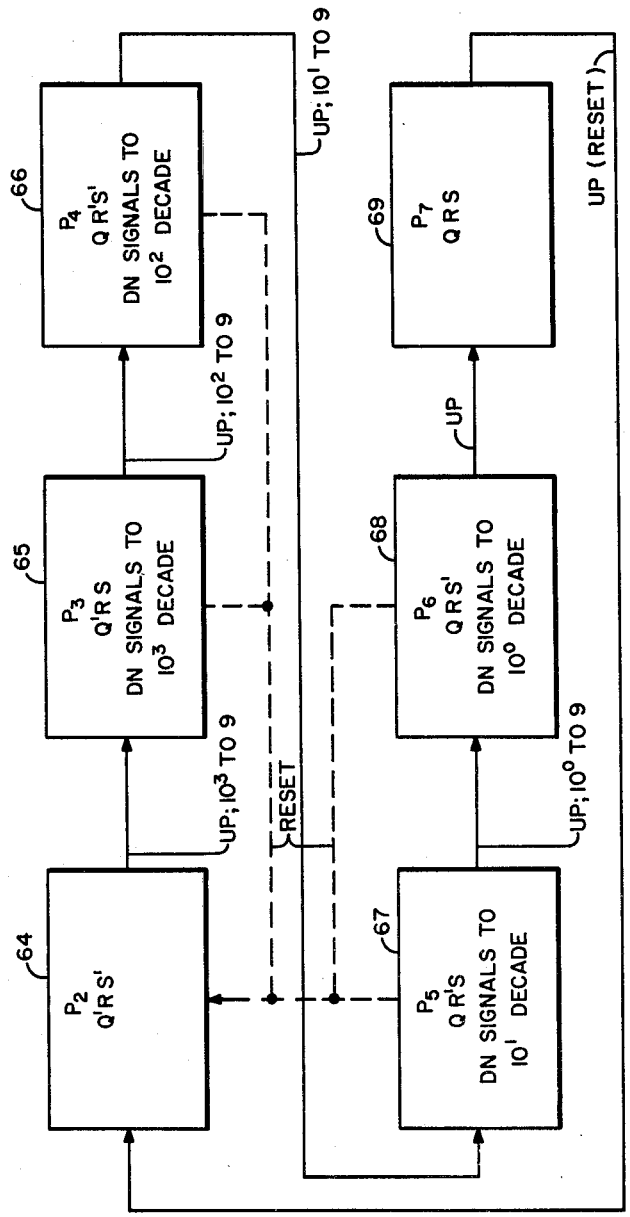
FIGURE 4 is a flow diagram illustrating the programming states of the programmer and reset unit.
Figure 5:
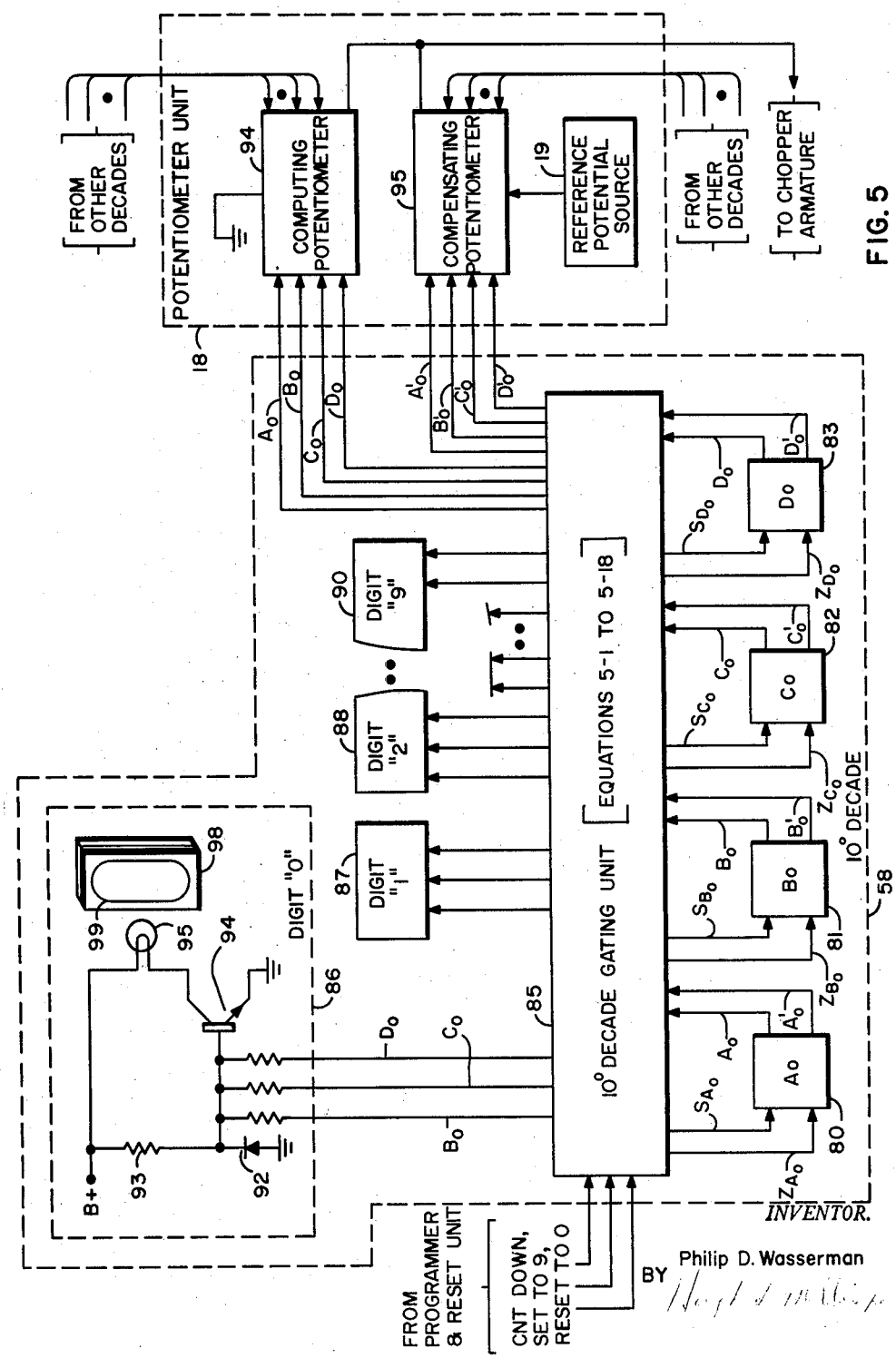
FIGURE 5 represents a typical decade gating unit in block diagrammatic form and its relationship with the reference potential source.

The operation of the Q, R, and S flip-flops and the decade units in response to UP and DOWN input signals is set forth in the programming diagram of FIGURE 4. In FIGURE 4, assume first of all that a reset signal is generated by reset generator 56, the conditions governing its generation being described in more detail later. The reset signal orders whatever Q, R and S conduction state combination then in effect triggered to the Q'RS' or $P_2$ program, as shown in block 64. During the $P_2$ program, nothing further is done until the next appearance of an UP signal, denoting that the input voltage is higher than the feedback voltage. This UP signal will quite naturally occur next since the reset signal ordering the $P_2$ program also zeroed all decades, that is, placed them in their zero value state, with a resulting zero-magnitude potentiometer feedback signal being applied to the chopper unit. In any event, this next appearing UP pulse triggers the $P_2$ program to the $P_3$ or Q'RS program in block 65 and simultaneously therewith orders the most significant digit decade, $10^3$, set to its maximum or "9" value. If the resulting feedback potential is higher than the applied signal, then the DOWN signals produced by the driver unit are routed by the $P_3$ program to the $10^3$ decade where the initial "9" value is reduced one unit by each DOWN pulse, through "8," "7," etc. This action continues until the potentiometer feedback voltage is less than the input signal at which time another UP pulse is generated which acts to transfer the $P_3$ to the $P_4$ or QR'S' program in block 66 and simultaneously sets the initially zero valued $10^2$ decade to its "9" value.

The operation as described for $P_3$ and the subsequent switch to $P_4$ continues similarly, with the next UP signal ordering $P_4$ transferred to $P_5$ or QR'S with the $10^1$ decade being set to "9." DOWN signals appearing during $P_5$ are counted down by the $10^1$ decade and the next UP signal transfers $P_5$ into the $P_6$ or QRS' program at 68. During $P_6$, DOWN signals are routed to the $10^0$ or least significant decade. A subsequent UP signal, representing the establishment of null, orders the QRS or $P_7$ program at 69 which, in turn, is triggered back to the initial or $P_2$ program by the next UP pulse. This complete cycle, from $P_2$ through $P_7$ and back to $P_2$ represents the operation of the voltmeter system in cycling through and obtaining one complete output reading.

The derivation of the gating circuitry defining the Q, R and S flip-flop triggerings in Boolean terms will be obvious to those skilled in the art and are set forth below as:

$$S_S = S' \text{ (UP)} \quad (3-1)$$
$$Z_S = S \text{ (UP)} + \text{(Reset)} \quad (3-2)$$
$$S_R = R'S \text{ (UP)} + \text{(Reset)} \quad (3-3)$$
$$Z_R = Q'RS \text{ (UP)} \quad (3-4)$$
$$S_Q = Q'S \text{ (UP)} \quad (3-5)$$
$$Z_Q = QRS \text{ (UP)} + \text{(Reset)} \quad (3-6)$$

As noted earlier, programming gating circuitry 54 includes circuitry which selectively routes the UP and DOWN pulses to selected "count down" and "to 9" conductors going to the various decade units. The Boolean equations defining the gating circuitry connected to these various signal leads are listed below. Their derivation from the programming diagram of FIGURE 4 will be apparent to those skilled in the art:

$$\text{"Cnt Dwn" to } 10^3 = Q'RS \text{ (DOWN)} \quad (3-7)$$
$$\text{"Cnt Dwn" } 10^2 = QR'S' \text{ (DOWN)} \quad (3-8)$$
$$10^1 = QR'S \text{ (DOWN)} \quad (3-9)$$
$$10^0 = QRS' \text{ (DOWN)} \quad (3-10)$$
$$\text{"To 9" to } 10^3 = Q'RS' \text{ (UP)} \quad (3-11)$$
$$10^2 = Q'RS \text{ (UP)} \quad (3-12)$$
$$10^1 = QR'S' \text{ (UP)} \quad (3-13)$$
$$10^0 = QR'S \text{ (UP)} \quad (3-14)$$

The reset generator operates upon the appearance of certain specified operating conditions, to be described shortly, to both reset the programming flip-flops Q, R and S to their initial $P_2$ or Q'RS' condition and order the flip-flop combinations in each decade unit reset to an initial "zero" digit representation. One factor producing a reset operation is the simultaneous appearance of an undefined Q, R and S flip-flop combination and the appearance of a DOWN clock signal. For example, in FIGURE 4, only six of the eight possible conduction state combinations of the three flip-flops are employed for programming purposes. In particular, the programs Q'R'S' and Q'R'S are not employed in the digital voltmeter logic but may nevertheless occur by reason of an erroneous flip-flop triggering or may appear when the power supply is initially turned on as a random flip-flop combination occurrence. Accordingly, in order to trigger the programming flip-flops from an undefined to a defined condition, a reset pulse is generated by a portion of its logic gating circuitry defined by:

$$\text{Reset (1)} = (Q'RS + QR'S' + QR'S + QRS')' \text{ (DOWN)} \quad (3-15)$$

Equation (3-15) denotes that a reset pulse is generated if the Q, R and S flip-flops do *not* form one of the $P_3$, $P_4$, $P_5$ or $P_6$ programs and a DOWN signal appears. This automatically triggers $P_7$ as well as the other two undefined programming states back to the $P_2$ program. The use of the DOWN pulse will obviously get the programming into a defined state assuming the potentiometer feed back voltage is higher than the input voltage. If the reverse is true, that is, the input voltage is higher than the potentiometer feed back voltage, and UP pulses are generated with an undefined condition in existence, the programmer will count the UP pulses until a defined combination exists at which time, proper operation of the system will ensue.

Another condition causing a reset pulse to be produced is the appearance of an UP pulse during the QRS or $P_7$ program as shown in FIGURE 4. As described earlier in connection with FIGURE 4, this pulse automatically triggers $P_7$ into $P_2$ and additionally, as is the case with all reset pulses, triggers all four decades to their "zero" value combination. The decade resetting is performed since a reading cycle is completed once the $P_6$ program is switched into $P_7$ following proper setting of the $10^0$ decade. Hence, the next UP pulse means that the reading just obtained is no longer accurate and initiation of another cycle is needed for continuing the voltmeter operation. The portion of the reset generator gating circuitry producing a reset pulse under the $P_7$ program conditions is:

$$\text{Reset } (2) = QRS \ (UP) \quad (3\text{-}16)$$

The final operational condition which requires a reset pulse is a DOWN signal being applied to a decade unit after its count has already reached zero during one of the $P_3$ through $P_6$ programs of FIGURE 4. This condition can occur when the input voltage suddenly changes negatively to the point where the decade readings already obtained during a given sample are higher than the changed input voltage. When this occurs, only DOWN pulses will be produced thereafter and without the necessary UP pulses no program changes can be made and the decade value selected by the programmer unit will be endlessly cycled by the DOWN pulses. However, by producing a reset pulse whenever a DOWN pulse is generated for a particular decade already at its "zero" value, that sample or cycle is automatically ended and a new sample started in the matter previously explained.

The portion of the reset generator gating circuitry producing a reset pulse for this latter condition is:

$$\text{Reset } (3) = (A'_0 B'_0 C'_0 D'_0)(QRS')(\text{DOWN})$$
$$+ (A'_1 B'_1 C'_1 D'_1)(QR'S)(\text{DOWN})$$
$$+ (A'_2 B'_2 C'_2 D'_2)(QR'S')(\text{DOWN}) + (A'_3 B'_3 C'_3 D'_3)$$
$$(Q'RS)(\text{DOWN}) \quad (3\text{-}17)$$

The particular term $(A'_0 B'_0 C'_0 D'_0)$ denotes that the $10^0$ unit decade flip-flops are in their defined "0" binary coded decimal digit combination as will be described in more detail later. The same applies equally to the terms $(A'_1 B'_1 C'_1 D'_1)$, $(A'_2 B'_2 C'_2 D'_2)$ and $(A'_3 B'_3 C'_3 D'_3)$ which correspond to "0" decimal digit values in the $10^1$, $10^2$, and $10^3$ decade units, respectively.

It will be appreciated that the final reset gating circuits in reset generator 56 is an "or" expression of Equations (3-15) through (3-17) above:

$$\text{Reset} = \text{Reset } (1) + \text{Reset } (2) + \text{Reset } (3) \quad (3\text{-}18)$$

In FIGURE 5 is shown the $10^0$ decade 58 in more detail and is taken as representative of the other decades 59, 60 and 61, previously shown in diagrammatic form in FIGURE 3. This decade includes four flip-flops 80, 81, 82 and 83 which are designated $A_0$, $B_0$, $C_0$ and $D_0$, respectively. Each flip-flop includes a pair of set and zero input terminals connected to a $10^0$ decade gating unit 85 and produces a pair of complementary output signals which are applied back to gating unit 85. The nomenclature employed for these flip-flops and their input and output terminals follows that previously used for the Q, R and S flip-flops in FIGURE 3.

A series of individual decimal digit readout units are indicated at 86, 87, 88 and through 90 representing the digits "0," "1," "2" through "9," respectively with only the "0" digit unit being shown in detail. In particular, the digit "0" readout unit 86 receives a selected set of flip-flops output signals, in particular, the $B_0$, $C_0$ and $D_0$, from gating unit 85. These three signal conductors are taken through individual resistors to a common junction which is both connected to ground through a diode 92, through a resistor 93 to a B+ or positive terminal of a source of potential not specifically illustrated, and finally, to the base electrode of a transistor shown generally at 94. The emitter of transistor 94 is connected to ground while its collector is coupled through a source of light, such as a lamp 95, to the previously noted B+ terminal. An output visual display element is located adjacent to lamp 95 and may comprise, for example, a thin rectangular block of lucite material 98, shown in perspective form. The numeral "0" is etched or engraved at 99 on one of the flat lucite surfaces.

The remaining digit readout units 87, 88 and through 90 are substantially identical to the "0" unit 86 just described except that the numerals engraved on their corresponding lucite plates correspond to their respective decimal digit representation. Also, each of their particular set of input signals are uniquely defined and involve different combinations of the $A_0$, $B_0$, $C_0$ and $D_0$ flip-flop output signals, as set forth in more detail shortly.

Potentiometer unit 18, shown in more detail in the following FIGURE 6, includes a computing potentiometer section 94 and a compensating potentiometer section 95. One signal terminal of computing potentiometer 94 is connected to ground while its other signal terminal is connected to one signal terminal of compensating potentiometer 95. The other signal terminal of potentiometer 95 receives the reference output signal produced by reference potential source 19. The junction point between the computing and compensating potentiometer signal connections represents the potentiometer output voltage and is applied to the chopper armature, as previously shown in FIGURES 1 and 2.

In addition to the signal input and output conductors of the computing and compensating potentiometers, a series of control input terminals are provided, one terminal for each flip-flop in each of the decade units. In particular, the flip-flop output signals $A_0$, $B_0$, $C_0$ and $D_0$ from the $10^0$ decade unit are applied to associated control input terminals of potentiometer 94. In the same way the unprimed output signals from the flip-flops in the remaining decade units are also applied to associated control terminals of potentiometer 94, as indicated generally in the figure.

The primed or $A'_0$, $B'_0$, $C'_0$ and $D'_0$ flip-flop signals from the $10^0$ decade are applied to associated control input terminals of compensating potentiometer 95. In addition, as indicated generally, the primed flip-flop output signals from the remaining decade units are likewise applied to associated potentiometer 95 control terminals.

Flip-flops $A_0$ through $D_0$ are arranged to represent the decimal digits "0" through "9" by their conduction state combination. Specifically, when in their "on" or "1" state, $A_0$, $B_0$, $C_0$ and $D_0$ represent the decimal digit values of "2," "4," "2," and "1," respectively. Whenever any of the four flip-flops is in its "0" or reset state, an output individual digit value of "0" is represented thereby. At any particular instant, the output decimal digit represented by the decade is formed by the combination of "1" and "0" binary states of its individual flip-flops and the sum of their corresponding decimal digit representations. The following list represents the various flip-flop conduction state combinations and the corresponding decimal digit representation. Also, these equations represent actual circuitry within gating unit 85 which are connected to the various digit readout units 86, 87, etc. corresponding to their decimal digit representation.

| | |
|---|---|
| $B'_0 C'_0 D'_0$—0 | (5-1) |
| $B'_0 C'_0 D_0$—1 | (5-2) |
| $B'_0 C_0 D'_0$—2 | (5-3) |
| $B'_0 C_0 D_0$—3 | (5-4) |
| $B_0 C'_0 D'_0$—4 | (5-5) |
| $B_0 C'_0 D_0$—5 | (5-6) |
| $A'_0 B_0 C_0 D'_0$—6 | (5-7) |
| $A'_0 B_0 C_0 D_0$—7 | (5-8) |
| $A_0 D'_0$—8 | (5-9) |
| $A_0 D_0$—9 | (5-10) |

Decade gating unit 85 automatically sets all of its associated flip-flops to their "1" condition, representing the decimal digit "9," upon receipt of a "set to 9" signal from the programmer and reset unit. Additionally, all flip-flops are triggered to their "0" state, representing the decimal digit "0," in response to a "reset to 0" signal from the programmer and reset unit. Finally, the count represented by the flip-flops at any time is decreased by one binary coded decimal unit in response to each "CNT DWN" or "count down" signal from the programmer unit.

The gating circuitry associated with these $A_0$ to $D_0$ flip-flop input terminals for providing the above stated triggering functions are represented by the following set of Boolean equations:

$$S_{A_0} = (\text{Set to } 9) \quad (5\text{-}11)$$
$$Z_{A_0} = (\text{Reset to } 0) + A_0 B_0 C_0 D'_0 (\text{CNT DWN}) \quad (5\text{-}12)$$
$$S_{B_0} = (\text{Set to } 9) \quad (5\text{-}13)$$
$$Z_{B_0} = (\text{Reset to } 0) + B_0 C'_0 D'_0 (\text{CNT DWN}) \quad (5\text{-}14)$$
$$S_{C_0} = (\text{Set to } 9) + C'_0 D'_0 (\text{CNT DWN}) \quad (5\text{-}15)$$
$$Z_{C_0} = (\text{Reset to } 0) + A'_0 C_0 D'_0 (\text{CNT DWN}) \quad (5\text{-}16)$$
$$S_{D_0} = (\text{Set to } 9) + D'_0 (\text{CNT DWN}) \quad (5\text{-}17)$$
$$Z_{D_0} = (\text{Reset to } 0) + D_0 (\text{CNT DWN}) \quad (5\text{-}18)$$

The connections between the flip-flops to the various output units through the diode gating unit are such as to energize one and only one of the indicator lamps in the various digit units. The Boolean equations defining the circuitry within the gating unit going to each of the readout units were given previously in Equations (5–1) to (5–10). Considering the operation of the digit "0" unit 86 taken as a representative digit output unit, assume that the output voltage levels of the flip-flops vary from ground or 0 volts representing the binary "0," to a negative potential of −12 volts, representing binary "1." Now, whenever flip-flops $B_0$, $C_0$ and $D_0$ are "0" or "off," signals $B_0$, $C_0$ and $D_0$ are each at ground potential and the complementary signals $B'_0$, $C'_0$ and $D'_0$ are at −12 volts. The resistor 93 and the series resistors connected between the common junction and the flip-flop output lines are so related in value that the common junction point is slightly positive when the flip flops are in the $B'_0$, $C'_0$ and $D'_0$ combination hence causing current conduction through transistor 94 and lamp 95. The light emitted by lamp 94 is preferably directed transversely through the edge of lucite plate 98 where it is defused by etched portion 99 to present a corresponding "0" image. On the other hand if any of the input flip-flop signals to unit 86 is at its −12 voltage, then the common junction point will be slightly negative. Diode 92 will then conduct and maintain the base of transistor 94 close to ground potential. Under this condition, no conduction takes place through transistor 94 and indicator lamp 95, with no visual output being accordingly presented by lucite plate 98.

If the lucite plates found in the various digit units 86 through 90 are arranged one in front of the other, then the particular unit's lamp which is lit at any specific time, presents its particular output decimal digit as the digit reading of the decade unit.

It will be further apparent that the displays associated with each of other decade units may be arranged similarly to the one just described for the $10^0$ decade. Also, the stacks of lucite plates for the $10^3$ through $10^0$ visual displays may then be arranged relative to each other, in a right-to-left position based on their relative digit significance in the final output number. This will result in a decimal number, displayed at all times, which represents the then existing output reading of the digital voltmeter. It will be further appreciated that from FIGURE 2, three similar, but smaller, lucite plates etched or engraved with a decimal point may be positioned between adjacent decade readouts corresponding to the three indicator lamps in the range readout unit 5 of FIGURE 2. Then, a decimal point will be displayed within the decimal number which corresponds to the particular position of range switch 3. Finally, an additional readout stage, positioned on the extreme left of the digit readouts, may include a pair of stacked lucite plates, having respective engraved or etched "+" and "−" marks on them. By connecting associated lamps to the polarity switch 9 of FIGURE 2, a corresponding polarity readout indication will be produced.

Figure 6:
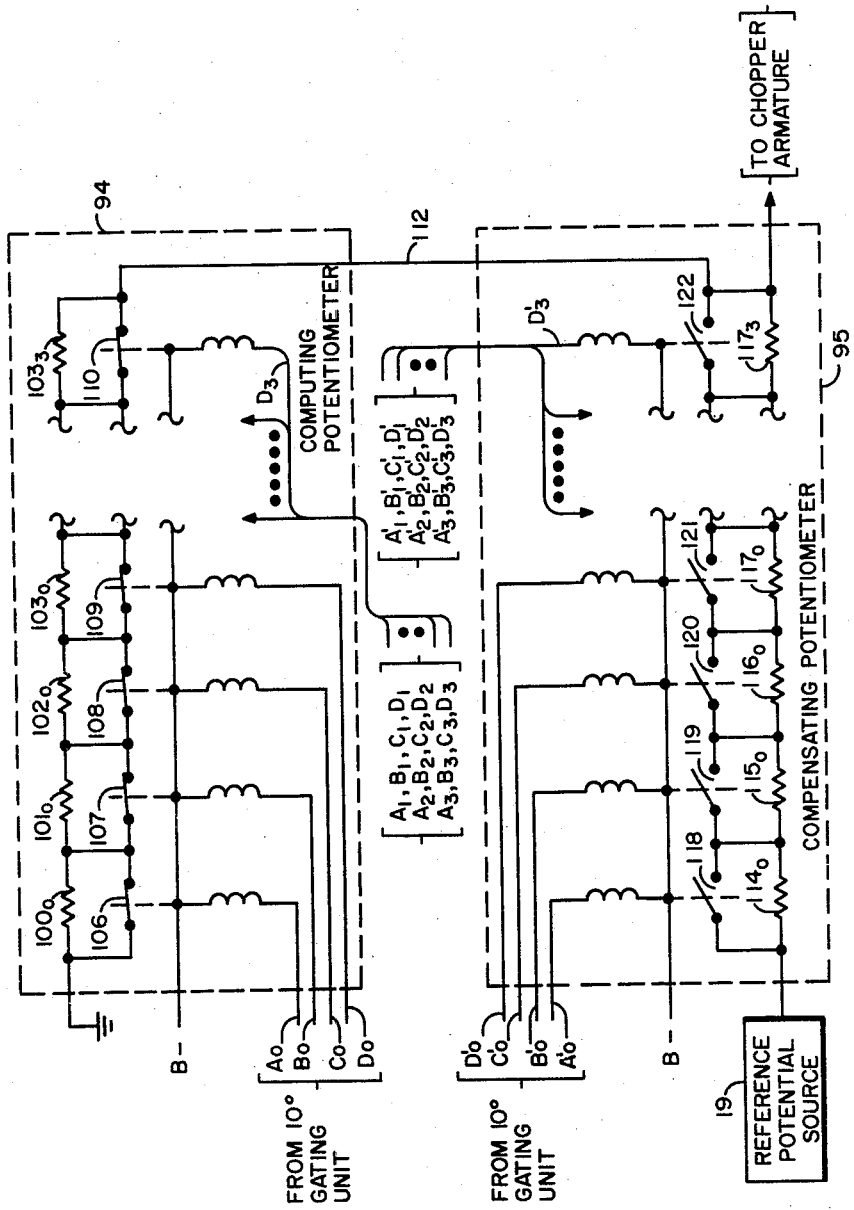
FIGURE 6 is a schematic representation of a portion of the reference potential source.

FIGURE 6 illustrates the reference potentiometer unit 18 in detail. The resistor portion of computing potentiometer 94 comprises a series of serially connected precision resistors beginning with $100_0$, $101_0$, $102_0$, and concluding with a final value $103_3$, the broken lines between the two ends indicating a series of resistors not specifically shown but whose values and placement will become clear during subsequent discussions. Each resistor in the potentiometer is shunted by a magnetically driven relay armature with relays 106, 107, 108, and 109, specifically shown as shunting resistors $100_0$, $101_0$, $102_0$, and $103_0$, respectively. The energizing coils of relays 106, 107, 108 and 109 are connected between a common bus and the $A_0$, $B_0$, $C_0$ and $D_0$ flip-flop output conductors, respectively, coming, as indicated, from the $10^0$ gating unit. In addition, the remaining resistors in the potentiometer, not specifically shown, are also associated with shunt connected relays which, in turn, are connected in the same order given for the $10^0$ gating unit flip-flop signals to the $10^1$, $10^2$ and $10^3$ gating units. The final resistor $103_3$ is shunted by relay element 110 whose energizing coil is connected between the common bus and the $D_3$ signal, produced by the $D_3$ flip-flop in the $10^3$ gating unit. The outside end of resistor 100 is connected to ground to represent the grounded input portion of the potentiometer circuitry while the potentiometer output signal appears on conductor 112, connected to the final resistor $103_3$.

These and the remaining potentiometer circuit relays are preferably of the sealed contact reed relay variety, for example RP–9272 manufactured by C. P. Clare & Co. This type of relay is formed by a pair of magnetically-operated, flexible, switch contacts hermetically sealed in an atmosphere of inert gas. Energization of an external coil causes the contact arms of the relay to engage with a subsequent closed circuit connection. When the external coil is de-energized, the contacts separate leaving an open circuit relay connection. The primary advantages of this type of relay reside in its low contact potential, high separating speed, high switching reliability and operational longevity. It will be appreciated, however, that other types of relays may be employed for the voltmeter with the understanding, however, that sufficient time must exist between consecutive UP and/or DOWN pulses to permit their operation.

Compensating potentiometer 95 is similar in all respects to potentiometer 94 and includes a number of serially connected precision resistor elements, starting at $114_0$ and going through $117_3$, which correspond in value to the $100_0$ through $103_3$ resistors, respectively, in potentiometer 94. Each of these resistors is likewise shunt connected by a relay armature and each energizing relay coil is driven by the complementary flip-flop signal from that employed to drive its opposite or reflected relay in computing potentiometer 94. Thus, the first four relays, 118 through 121, are driven by the $A'_0$ to $D'_0$ flip-flop signals and the final relay 122, is energized by the $D'_3$ signal.

The output signal from this reference potential source going to the chopper armature is taken from conductor 112 which is connected to one end of the right hand resistor $117_3$ of compensating potentiometer 93. Reference potential source 19 is connected to the outer end of resistor $114_0$ to complete the circuit connections.

In considering the operation of the reference potential source, the operation of a single flip-flop, $A_0$, in conjunction with its pair of related relays and resistors is first discussed. Since the complementary $A_0$ and $A'_0$ signals are applied to relays 106 and 118, respectively, one of this relay pair is always open and its associated resistor placed in a series between ground and the reference potential source 19 while the other relay is closed with its corresponding resistor effectively shorted out in the ground to reference potential path. In particular, when the $A_0$ flip-flop is at its "0" state, as is represented in the figure, the $A_0$ signal is at "0" or ground potential with a resulting current flow through the relay 106 energizing coil to the B− terminal and the switch arm of relay 106 accordingly closed to thereby short out resistor 100. Continuing, signal $A'_0$ is "on" or −12 volts, with no current subsequently flowing through the relay coil of relay 118, assuming the B− potential to be −12 volts. Hence, the armature or contact arm of relay 118 is open, as indicated in the figure, and resistor 114 placed in series with the remaining potentiometer circuitry.

If the relays and resistors associated with flip-flop $A_0$ were the only ones in the potentiometer, then the entire voltage drop from source 19 would appear across resistor $114_0$ and the output voltage from the potentiometer appearing on line 112 would be ground or "0" volts. On the other hand if $A_0$ flip-flop were in its "1" condition, then relay 106 would be de-energized with resistor $100_0$ placed in the circuit while relay 118 would be energized and resistor $114_0$ shunted out of the series path. Under this condition, continuing the previous example, the entire voltage drop would appear across resistor $100_0$ and the reference signal would be applied to conductor 112 as the potentiometer output potential.

By employing the complementary output signals of each flip-flop in the manner shown, that is, its associated resistor in one of the potentiometer halves is always in series with the precision voltage source and ground and its associated resistor in the other half of the potentiometer is shorted out, one and only one of its two associated equally-valued resistors is in series at any time between the reference potential source and ground. Hence, the resistance loading offered to the reference potential source by the serially connected two potentiometer halves is always a predetermined constant thereby enhancing the measuring accuracy of the system.

Considering now the portion of the potentiometer corresponding to the $10^0$ gating unit, the various resistors are related in value corresponding to the relative digit values of their associated flip-flops. In particular since flip-flops $A_0$, $B_0$, $C_0$ and $D_0$ bear a "2," "4," "2," "1" ratio relationship, respectively, resistors $100_0$, $101_0$, $102_0$ and $103_0$ would have corresponding relative values of "2," "4," "2," and "1," respectively. If resistor $103_0$ is 5 ohms, by way of example, then resistors $102_0$, $101_0$, $100_0$ would have values of 10 ohms, 20 ohms, and 10 ohms, respectively. With this relationship maintained the value of the series resistance offered by this set of resistors is a direct function of the decimal number represented by the $10^0$ gating unit flip-flop value combination.

Continuing, since the various gating units are scaled in powers of 10 relative to each other, the corresponding resistors in the potentiometer portion associated with the $10^1$ gating unit are 10 times that of the resistors shown related to the $10^0$ unit. That is, the series of resistors associated with the $10^1$ unit have values of 50, 100, 200, and 100 ohms corresponding to the previously noted values for resistors $103_0$, $102_0$, $101_0$ and $100_0$, respectively in the $10^0$ unit.

In the same way, the respective $10^2$ decade unit resistors would have values of 500, 1,000, 2,000, and 1,000 ohms while those in the $10^3$ decade unit would have values of 5,000, 10,000, 20,000 and 10,000 ohms, both sets of resistors corresponding to resistors $103_0$, $102_0$, $101_0$, and $100_0$, respectively, in the $10^0$ unit.

It will be appreciated by those skilled in the art that the specific embodiment set forth for illustrating the present invention represents only one of a number of possible variations capable of achieving the same result without involving the invention. For example, synchronous digital computer techniques of the type employed may take any one of a large number of possible forms as are known and practiced in the digital computer art without involving invention. Hence, "nand" and/or "nor" circuits could be employed instead of the "and" or "or" circuits shown. Also, the flip-flops and other circuitry are not specifically limited to the use of semi-conductor elements inasmuch as other types of components, for example, magnetic elements, vacuum tubes, etc. could be equally well employed without involving invention. Also, the specific type of edge lighted lucite plates employed for readout, as illustrated, could obviously be changed to projection types or special vacuum tube direct decimal digit display types.

The logic portion of the system could readily be extended to include automatic range and polarity switching. In addition, the particular number of decade unit stages may be varied without involving invention as a function both of the basic accuracy desired and that capable of being achieved by the potentiometer and potential voltage source. Finally, it will be appreciated by those skilled in the art that the foregoing description relates only to one detailed embodiment of the present invention but whose scope and spirit is set forth in the embodied claims.

What is claimed is:

1. An electronic measuring instrument for measuring the value of an input voltage and visually displaying the value of the voltage as a series of output decimal digits representing a decimal number, said instrument comprising: a series of decade units corresponding to the series of output displayed decimal digits, respectively, each of said decade units including digital means having a plurality of binary coded states corresponding to a plurality of output decimal digits, respectively, visual readout means responsive to the existing binary coded state of its digital means for producing a corresponding visual decimal output image, potentiometer means for producing an output voltage corresponding to the particular decimal digit represented by said digital means and to the particular decimal digit in the displayed decimal number represented by said decade unit, and means responsive to an applied input signal for changing the binary coded state of said digital means to represent the next lower decimal digit value; means for combining the output voltages produced by the potentiometer means in said series of decade units to produce a feedback voltage corresponding to said displayed decimal number; comparison means for comparing the input and feedback voltages and producing first and second pulses when the input voltage is higher and lower, respectively, than said feedback voltage; and digital programming means having a series of binary coded states corresponding to said series of decade units, respectively, said digital programming means being responsive to the first pulses produced by said comparison means for changing its binary coded value to correspond to the next following decade unit in said series of decade units, and responsive to its existing binary coded state for routing the second pulses produced by said comparison means to the corresponding decade unit whereby the series of decade units are sequentially driven to represent the decimal equivalent of the input voltage by their combined binary coded states.

2. The electronic measuring instrument according to claim 1 wherein the digital means in each of said series of digital decade units includes a set of electronic flip-flop means, said set having ten binary coded states corresponding to the plurality of decimal digits from "0" through "9."

3. The electronic measuring instrument according to claim 2 wherein said programming means includes, in addition, means responsive to each first pulse produced by said comparison means for triggering the set of flip-flop means in the next following decade unit of said series of decade units to its binary coded state representing the decimal digit "9" whereby any following second pulses will be routed by said programming means to said next following decade unit as an applied input signal where it is counted down from its initial "9" digit value.

4. The electronic measuring instrument according to claim 3 which includes, in addition, means responsive to the binary coded state of said programming means corresponding to the last of said series of decade units and a first pulse produced by said comparison means for both triggering said programming means to a binary coded state associated with the first of said series of decade units and triggering the set of flip-flop means in each of said decade units to a binary coded state representing the decimal digit "0."

5. The electronic measuring instrument according to claim 4 including, in addition, reset means responsive to all binary coded states of said programming means having no association with said series of decade units and a first signal produced by said comparison means for producing a reset signal, said programming means including, in addition, means responsive to a reset signal for triggering to a binary coded state associated with the first of said decade units, and each of said decade units including, in addition, means responsive to a reset signal for triggering to the binary coded state representing the decimal digit "0," and means for applying each of the reset signals produced by said reset means to each of said decade units and to said programming means.

6. The electronic measuring instrument according to claim 5 in which said reset means includes, in addition, means responsive to a binary coded state representing the decimal digit "0" of a decade means corresponding to the binary coded state of said programming means and a second signal produced by said comparison means for producing a reset signal.

7. The electronic measuring instrument according to claim 6 including, in addition, first actuable means selecably actuable to one of a multiple of states for scaling down the magnitude of the input voltage in discrete steps to the point where its magnitude is less than the maximum value of said feedback voltage, said first actuable means additionally including means for displaying its selected state as a decimal point in said displayed output decimal number.

8. The electronic measuring instrument according to claim 7 including, in addition, second actuable means selectably actuable to one of a pair of states for effectively reversing or not reversing, respectively, the polarity of the input voltage whereby either negative or positive input voltages may be compared with said feedback voltage by said comparison means, said second actuable means including, in addition, means for displaying its selected state as a minus or plus sign preceding said displayed decimal number.

9. An electronic measuring instrument for measuring the value of an input signal and visually displaying its voltage as a series of output decimal digits representing an output decimal number, said instrument comprising: a series of decade units corresponding to the series of output displayed decimal digits, respectively, each of said decade units including a plurality of digital means having ten conduction state combinations corresponding to the ten decimal digits, respectively, visual readout means responsive to the existing conduction state combination of its plurality of digital means for producing a corresponding visual decimal output image, and means responsive to an applied input signal for changing the conduction state combination of said digital means to represent the next lower decimal digit value; a series of actuable resistor means corresponding to said series of decade units, respectively, each of said actuable resistor means being actuated by the particular conduction state combination of the plurality of digital means in its associated decade unit to a corresponding resistance value, the series of corresponding resistance values of said series of decade units being related to each other in accordance with the significance of their corresponding output decimal digits in the output decimal number whereby the serial resistance presented by said series of actuable resistor means corresponds to the output decimal number; feedback voltage means responsive to the value of said serial resistance for producing a corresponding feedback voltage; comparison means for comparing the input and feedback voltages and producing first and second pulses when the input voltage is higher and lower, respectively, than said feedback voltage; and digital programming means having a series of binary coded states corresponding to said series of decade units, respectively, said digital programming means being responsive to the first pulses produced by said comparison means for changing its binary coded value to correspond to the next following decade unit in said series of decade units, and responsive to its existing binary coded state for routing the second pulses produced by said comparison means to the corresponding decade unit whereby the series of decade units are sequentially driven to represent the decimal equivalent of the input voltage by their combined conduction state combinations.

10. The electronic measuring instrument according to claim 9 wherein the plurality of digital means in each of said series of decade units includes four flip-flop means, each of said flip-flops always being at one of two binary states, the ten conduction state combinations corresponding to ten different binary state combinations of said four flip-flop means, each actuable resistor means of said series of actuable resistor means includes four serially connected resistors and four selectively actuable shunting means connected across said four resistors, respectively, one selectively actuable shunting means and associated resistor means for each of said four flip-flop means, and means responsive to one binary state of each of said four flip-flop means in each of said decade units for actuating its associated selectively actuable shunting means whereby its corresponding resistor means is shunted out, the resistance of each of said series of actuable resistor means being determined by the flip-flop means in its associated decade unit which are in their other conduction state.

11. A digital voltmeter for measuring and displaying the value of an applied input signal, said voltmeter comprising: a series of flip-flop means, said series of flip-flop means having a plurality of flip-flop conduction state combinations and a corresponding plurality of complementary state combinations; constant load potentiometer means including first and second portions, said first portion being responsive to flip-flop conductive state combinations and said second portion being responsive to flip-flop complementary state combinations for producing a plurality of feedback voltage signals, each respectively corresponding to a different flip-flop conduction and complementary state combination; means connected to said potentiometer means for alternatively sampling an applied input signal and said feedback voltage signal and operable in response to the difference in voltage between the input signal and said feedback signal for changing the conduction states of said series of flip-flops to reduce the voltage difference between the input signal and said feedback voltage signal, whereby said series of flip-flops is driven to one of its plurality of conduction and complementary state combinations corresponding to a feedback voltage signal whose magnitude equals the magnitude of the applied input signal; and means for producing a read-out indication of the conduction state combination of said series of flip-flop means, whereby a read-out indication of said one combination corresponds to the value of the input signal.

12. An electronic digital voltmeter for determining the value of an applied input signal, said voltmeter comprising: a series of digital decade means, each of said decade means having a plurality of logically coded steady state conditions corresponding to a plurality of decimal digits, respectively, and responsive to an applied driving signal for changing its steady state condition to correspond to a next decimal digit value; a series of potentiometer means corresponding to said series of decade means, respectively, each of said potentiometer means producing an output voltage whose magnitude corresponds to the steady state condition of its associated decade means; means for adding the output voltages produced by said series of potentiometer means to produce a feedback signal; comparison means for alternatively sampling an applied input and said feedback signal for comparing the magnitudes of the input signal and said feedback signal to produce first and second driving signals when the magnitude of the input signal is higher and lower, respectively, than the magnitude of said feedback signal; and logical gating means connected between said comparison means and said series of decade means, for applying said first and second driving signals produced by said comparison means to individual ones of said series of decade means to change the steady state condition thereof for decreasing and increasing, respectively the decimal digit values represented thereby, whereby said series of decade means are selectively actuated to a series of steady state conditions which correspond to the value of the applied input voltage.

13. The digital voltmeter of claim 12 in which said series of decade means has a plurality of logically coded steady state combinations and a corresponding plurality of complementary state combinations, and in which said series of potentiometer means comprises constant load potentiometer means including first and second portions associated with each of said decade means, said first portions being responsive to decade steady state combinations and said second portions being responsive to decade complementary state combinations, said feedback signal being derived from one of said first and second portions.

14. An electronic measuring instrument for measuring the value of an applied input signal and for visually displaying the magnitude of the voltage of the input signal as a series of output decimal digits representing an output decimal number, said instrument comprising: series of decade units corresponding to the series of output displayed decimal digits respectively, each of said decade units including a plurality of digital means having ten conduction stage combinations corresponding to the ten decimal digits, respectively, visual readout means responsive to the existing conduction state combination of its plurality of digital means for producing a corresponding visual decimal output image, and means responsive to an applied driving signal for changing the conduction stage combination of said digital means to represent the next decimal digit value; a series of actuable resistor means corresponding to said series of decade units, respectively, each of said actuable resistor means being actuated by the particular conduction state combination of the plurality of digital means in its associated decade unit to a corresponding resistance value, the series of corresponding resistance values of said series of decade units being related to each other in accordance with the significance of their corresponding output decimal digits in the output decimal numbers, whereby the serial resistance presented by said series of actuable resistor means corresponds to the output decimal number; feedback voltage means responsive to the value of said serial resistance for producing a corresponding feedback voltage; comparison means alternatively sampling an applied input signal and said feedback voltage for producing first and second driving signals when the input signal voltage is greater and less in magnitude, respectively, than said feedback voltage; and logical gating means connected between said comparison means and said series of decade units for selectively applying first and second driving signals produced by said comparison means to said series of decade units, being responsive to one of said first and second driving signals for selecting a decade unit, and responsive to the other of said first and second signals to change the conduction state combinations of the selected decade unit, whereby the series of decade units are sequentially driven to represent the decimal equivalent of the input voltage by their combined conduction state combinations.

15. The electronic measuring instrument according to claim 14 wherein the plurality of digital means in each of said series of decade units includes four flip-flop means, each of said flip-flops always being at one of two binary states, ten conduction state combinations corresponding to ten different binary state combinations of said four flip-flop means, each actuable resistor means of said series of actuable resistor means includes four serially connected resistors and four selectively actuable connecting means shunt connected across said four resistors, respectively, one selectively actuable connecting means and associated resistor means for each of said four flip-flop means, and means responsive to one binary state of each of said four flip-flop means in each of said decade units for actuating its associated selectively actuable connecting means, whereby its corresponding resistor means is shunted out, the resistance of said series of actuable resistor means being determined by the flip-flop means in its associated decade units, which are in their other conduction state.

16. The electronic measuring unit according to claim 15 including, in addition, a second series of actuable resistor means corresponding to said series of decade units, respectively, each of said second series of actuable resistor means being actuated by the particular complementary condition state combination of the plurality of digital means in is associated decade unit to a corresponding resistance value, each actuable resistor means of said second series of actuable resistor means including four serially connected resistors and four selectively actuable connecting means shunt connected across said four resistors, respectively, one selectively actuable shunting means and associated resistor means for each of said four flip-flop means, and means responsive to the other binary state of each of said four flip-flop means in each of said decade units for actuating its associated selectively actuable connecting means whereby its corresponding resistor means is shunted out, the resistance of each of said second series of actuable resistor means being determined by the flip-flop means in its associated decade unit which are in their said one conduction state, the series of corresponding complementary resistance values of said series of decade units being related to each other in accordance with the significance of the complement of their corresponding output decimal digits in the output decimal number; means for applying a first reference potential to a first terminal of said series of actuable resistor means corresponding to the output decimal number; means for applying a second reference potential to a first terminal of said second series of actuable resistor means corresponding to said complementary decimal number; and feedback output means connected to the other terminals of both of said actuable resistor means, whereby the serial resistance from said first reference potential to said second reference potntial is at all times constant and whereby the feedback voltage signal is varied between a magnitude equal to said first reference potential and the magnitude of said second reference potential and represents a voltage corresponding to the decimal digits represenetd by said series of decade units.

References Cited in the file of this patent

UNITED STATES PATENTS

| | | |
|---|---|---|
| 2,996,669 | Morgan et al. | Aug. 15, 1961 |
| 3,052,845 | Bowes | Sept. 4, 1962 |
| 3,052,880 | Young | Sept. 4, 1962 |
| 3,064,247 | Lang | Nov. 13, 1962 |

FOREIGN PATENTS

| | | |
|---|---|---|
| 842,924 | Great Britain | July 27, 1960 |
| 869,406 | Great Britain | May 31, 1961 |

OTHER REFERENCES

Publication, "A Digital Potentiometer," in Electronic Engineering, pages 66–69, February 1956.